(12) United States Patent
Brown, Jr. et al.

(10) Patent No.: US 7,528,705 B2
(45) Date of Patent: May 5, 2009

(54) TIRE PRESSURE MONITORING METHOD

(75) Inventors: Jack Edward Brown, Jr., Akron, OH (US); Peter Ross Shepler, Stow, OH (US); Robert Leon Benedict, Tallmadge, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 267 days.

(21) Appl. No.: 11/457,562

(22) Filed: Jul. 14, 2006

(65) Prior Publication Data

US 2008/0018444 A1  Jan. 24, 2008

(51) Int. Cl.
*B60C 23/02* (2006.01)
(52) U.S. Cl. .................................. 340/442; 340/443
(58) Field of Classification Search .................. 340/442
See application file for complete search history.

(56) References Cited

U.S. PATENT DOCUMENTS

| | | | |
|---|---|---|---|
| 5,218,861 A | 6/1993 | Brown et al. | |
| 5,413,159 A | 5/1995 | Onley et al. | |
| 5,573,611 A | 11/1996 | Koch et al. | |
| 6,124,647 A | 9/2000 | Marcus et al. | |
| 6,255,940 B1 | 7/2001 | Phelan et al. | |
| 6,294,989 B1 | 9/2001 | Schofield et al. | |
| 6,445,287 B1 | 9/2002 | Schofield et al. | |
| 6,472,979 B2 | 10/2002 | Schofield et al. | |
| 6,591,671 B2 | 7/2003 | Brown | |
| 6,647,773 B2 | 11/2003 | Nantz et al. | |
| 6,774,774 B2 | 8/2004 | Schofield et al. | |
| 6,868,358 B2 | 3/2005 | Brown, Jr. | |
| 6,975,215 B2 | 12/2005 | Schofield et al. | |
| 7,323,975 B2 * | 1/2008 | Hall et al. | 340/442 |
| 2004/0145457 A1 | 7/2004 | Schofield et al. | |
| 2005/0040941 A1 | 2/2005 | Schofield et al. | |

OTHER PUBLICATIONS

Johannes Winterhagen, Intelligent Tires for Commercial Vehicles Tire sensors by Siemens VDO better protect driver and machine, www.siemens.com, article dated Oct. 18, 2006 (2 pages).
Goodyear Newsroom, First Direct Battery-less Tire Measurement Technology Available from Goodyear, Siemens VDO Automotive, news article dated Mar. 6, 2003 (2 pages).
Siemens Media Center, Tires With Brains Siemens VDO Automotive Electronics Make Tires Intelligent, news article Frankfurt, Germany Sep. 9, 2003 (2 pages).
PR Newswire, Goodyear and Siemens Raise Tire IQ, news article Akron, Ohio Jan. 10, 2005 (1 page).
Goodyear Newsroom, Goodyear Works with Wal-Mart to Bring RFID Supply Chain Technology to the Tire Industry, news article Akron, Ohio Mar. 11, 2004 (1 page).

* cited by examiner

*Primary Examiner*—Jeff Hofsass
*Assistant Examiner*—Ojiako Nwugo
(74) *Attorney, Agent, or Firm*—Wood, Herron & Evans, LLP

(57) ABSTRACT

Methods of monitoring tire pressure and responding to a tire pressure error. A tire pressure monitoring apparatus provides signals to a vehicle control representing pressures in respective ones of the tires. The vehicle control first detects a tire pressure error in one of the tires, and then presents to a user a first signal representing the tire pressure error in the one of the tires. Then, a user input representing a prospective tire filling activity is detected. Thereafter, a second signal is presented to the user in response to a pressure in the one of the tires being substantially equal to a desired tire pressure.

15 Claims, 3 Drawing Sheets

TIRE PRESSURE MONITORING METHOD

FIELD OF THE INVENTION

The invention relates generally to a tire monitoring and warning system and more particularly, to a tire pressure monitoring cycle in response to tire cavity pressures.

BACKGROUND OF THE INVENTION

It is well documented that maintaining a correct tire pressure improves handling, increases gas mileage, and extends the useful life of vehicle tires. Moreover, maintaining a correct tire pressure is an important consideration to the safe operation of a vehicle. Despite its irrefutable importance, tire pressure may not be monitored and maintained frequently enough by many in the driving public. Even well maintained tires may undergo a loss of pressure during the operation of a vehicle after sustaining damage, creating a potentially hazardous situation to the operator. In addition, with the advent of "extended mobility tires" (EMT) and their increasingly widespread commercial presence, it may be difficult for a vehicle operator to detect a low pressure or leak condition and take appropriate action. As a result, extended use of a tire in a low pressure condition beyond the manufacturer's recommended limit may occur.

Tire pressure monitoring systems have been developed and are in limited use. Such systems typically comprise a sensor located in the tire to perform real-time interior air pressure and temperature monitoring. The information is wirelessly transmitted to the driver via radio frequencies (RF) and displayed in the driver compartment of the vehicle. The remote sensing module consists of a tire condition monitor, for example, a pressure sensor and/or a temperature sensor, a signal processor, and an RF transmitter. The system may be powered by a battery or the sensing module may be "passive"; that is, power may be supplied to the sensing module by way of magnetic coupling with a remote transmitter that is connected to an electronic control unit ("ECU"). The ECU can either be dedicated to tire pressure monitoring or share other functions in the car. For instance, the ECU could be a dashboard controller or other onboard computer. Examples of such tire monitoring systems are more fully described in U.S. Pat. Nos. 6,868,358 and 6,591,671 owned by the assignee of this application, which patents are hereby incorporated in their entireties by reference herein.

The purpose of a tire monitoring system is to provide the driver with a warning should a pressure anomaly occur in one or more tires. Typically, tire pressure and temperature are reported parameters. To be useful, the information must be quickly communicated and be reliable. Further, simply displaying the tire pressure information does not help a user remedy the situation. Therefore, there is a need for a tire monitoring system that not only displays tire pressure anomalies but also assists the user in satisfactorily resolving those anomalies.

SUMMARY OF THE INVENTION

The present invention provides a simple, integrated tire pressure monitoring system that not only warns of incorrect tire pressures but also facilitates a user in providing correct tire pressures.

According to the principles of the present invention and in accordance with the described embodiments, the invention provides a method of monitoring pressures in respective tires of a vehicle. The vehicle has tire pressure monitoring apparatus providing signals to a vehicle control representing pressures in respective ones of the tires. The vehicle control has user I/O and the method first detects a tire pressure error in one of the tires, and then presents to a user a first sensory perceptible signal representing the tire pressure error in the one of the tires. Then, a user input representing a prospective tire filling activity is detected; and thereafter, a second sensory perceptible signal is presented to the user in response to a pressure in the one of the tires being substantially equal to a desired tire pressure. Thus, the method provides the user assistance in determining when a tire is properly filled after a tire pressure error has been displayed.

In one aspect of this invention, the first sensory perceptible signal is a visual display; the user input is an input button on a visual display; and the second sensory perceptible signal is either a visual display or an audible signal.

In another embodiment, the method detects a change in tire pressure in a first tire and determines if the first tire is substantially the same as the one of the tires. Then a third sensory perceptible signal is presented to the user in response to the first tire being different from the one of the tires. In one aspect of this invention, the third sensory perceptible signal is either a visual display or an audible signal.

These and other objects and advantages of the present invention will become more readily apparent during the following detailed description taken in conjunction with the drawings herein.

DETAILED DESCRIPTION OF THE INVENTION

Figure 1:
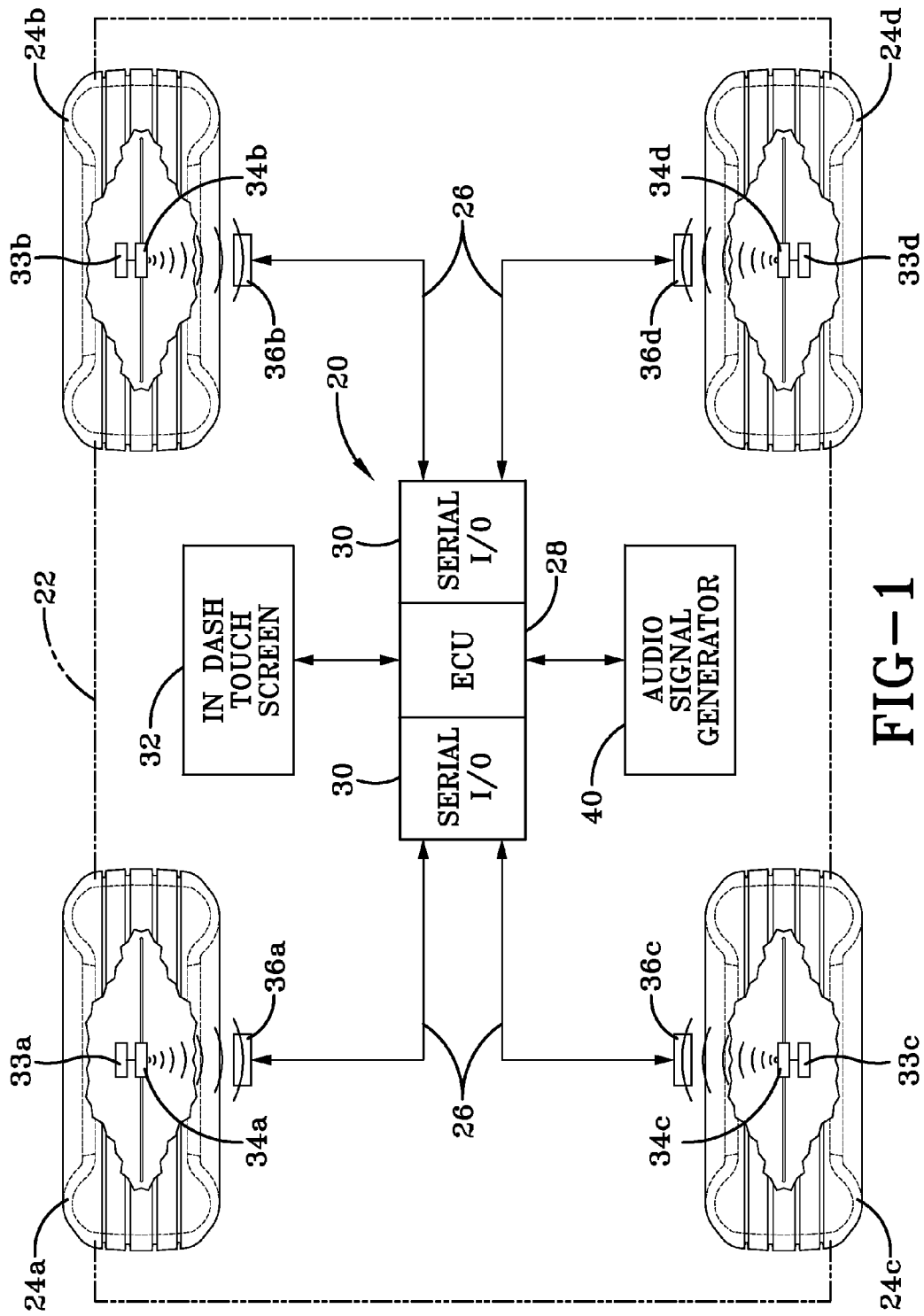
FIG. 1 is a schematic block diagram of one exemplary embodiment of a tire condition monitoring system in accordance with the principles of the present invention.

Referring to FIG. 1, a tire condition monitoring and control system 20 is installed on a vehicle 22, shown in phantom, for example, a passenger vehicle having four pneumatic tires 24a, 24b, 24c and 24d installed on four respective wheels (not shown). The vehicle 22 is equipped with a multiplexed, bidirectional serial data bus 26, for example, an RS-485, a LAN or comparable data bus, which may be implemented with a twisted pair of insulated wires. The serial data bus 26 is connected to a serial data bus interface 30 within an ECU 28, for example, an on-board vehicle computer, an in-dash controller or comparable computer or controller. The ECU has a display unit 32, for example, an in-dash touch screen, an LCD screen or comparable display, that is connected either directly to the ECU 28 as shown, or is indirectly connected to the ECU 28 via the serial data bus 26. It is within the scope of the invention that if no data bus is provided on the vehicle, one can be added thereto. For example, in the absence of an existing vehicle data bus, a dedicated data bus may be provided in accordance with known serial communications standards acceptable for this application.

The four tires 24a-24d are equipped with respective known electronic modules ("tags") 34a-34d, respectively, and known respective tire condition sensors 33a-33d that are capable of monitoring one or more conditions such as air pressure and/or air temperature within a respective tire. Each tag is operative to transmit radio frequency (RF) signals indicative of, or modulated as a function of, one or more monitored conditions within a respective vehicle tire. In one exemplary embodiment, the tags 34a-34d are transponders such as those used with radio frequency identification tags but may alternatively simply comprise one or more condition sensors and a radio frequency transmitter.

The system 20 also has four known monitors or interrogation units 36a-36d associated with respective tires 24a-24d and preferably located in proximity therewith, for example, mounted within respective wheel wells of the vehicle 22 in a known manner. The monitors 36a-36d are connected to a source of power (not shown) and are also connected to the serial data bus 26 for individually communicating with the ECU 28. The monitors 36a-36d have respective antenna 38a-38d and respective transmitter/receivers (not shown) for transmitting signals to, and receiving signals from, respective tags 34a-34d. The monitors 36a-36d may be implemented using a data transceiver, for example, a DS36277 Dominant Mode Multipoint Transceiver commercially available from National Semiconductor of Santa Clara, Calif.

A monitor's transmissions to a respective tag may comprise a carrier signal for energizing a passive tag, and may comprise signals to "wake up" an active tag which is in a low-power sleep mode. It is within the scope of the invention that all components of a monitor 36a-36d including a respective antenna 38a-38d can be encapsulated in a single package. Alternatively, the antenna can be disposed outside of such a package.

Monitored tire condition data carried by the RF signals from tags 34a-34d may be decoded, for example, demodulated, provided to the ECU 28 and presented to a user via the touch screen display 32. In a known manner, visual warnings and alarms may be presented to a user via the touch screen 32. In other known embodiments, audible warnings and alarms may be presented to a user by the ECU 28 activating an audio signal generator 40. The audible signals may be in the form of synthesized voice messages and/or beeps, chimes, buzzes or other sounds of differing durations and/or frequencies or other audio signals. The exact form of the sensory perceptible signals, for example, the audible and visual warnings and alarms, is often determined by a vehicle manufacturer. Additionally, the information regarding dynamic conditions of the tires can be utilized in controlling the vehicle, such as by providing relevant inputs to a "smart" suspension system.

Figure 2:
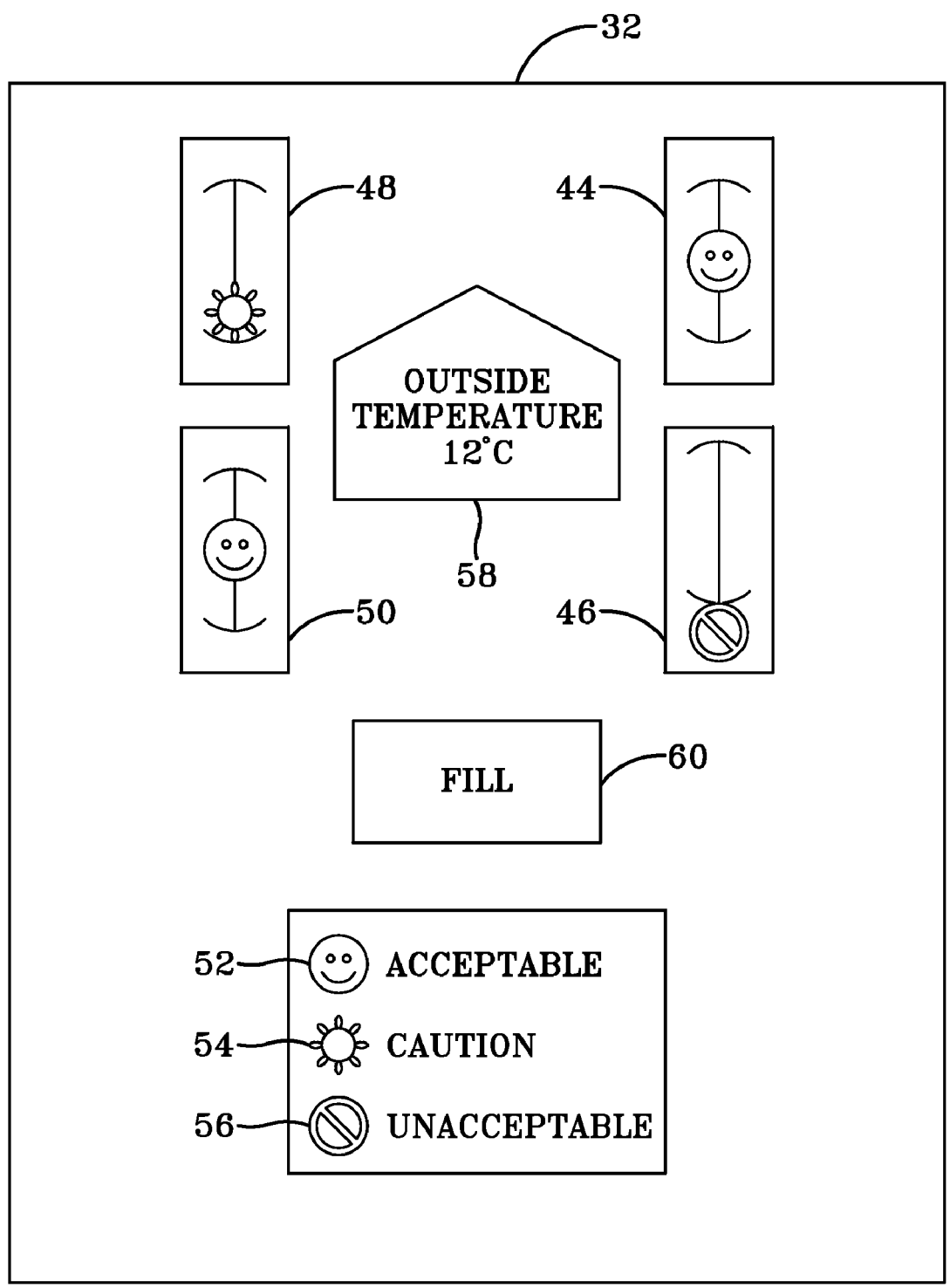
FIG. 2 is a schematic illustration of one example of a display for presenting tire condition data to a user with the tire condition monitoring system of FIG. 1.

FIG. 2 illustrates one of many alternative tire information display configurations that may be implemented using the in-dash touch screen 32. An array of four vertical bars 44, 46, 48, and 50 may be used to represent the respective four tires 24a-24d of the vehicle 22 shown in FIG. 1; and icons 52, 54, 56 are employed to indicate respective good, cautionary and unacceptable tire pressure ranges. Displays of the icons 52-56 representing tire pressures are demonstrated in the vertical bars 44-50. The choice of icons and associated displays may vary depending on the vehicle manufacturer. An outside temperature may also be displayed as shown at 58.

Figure 3:
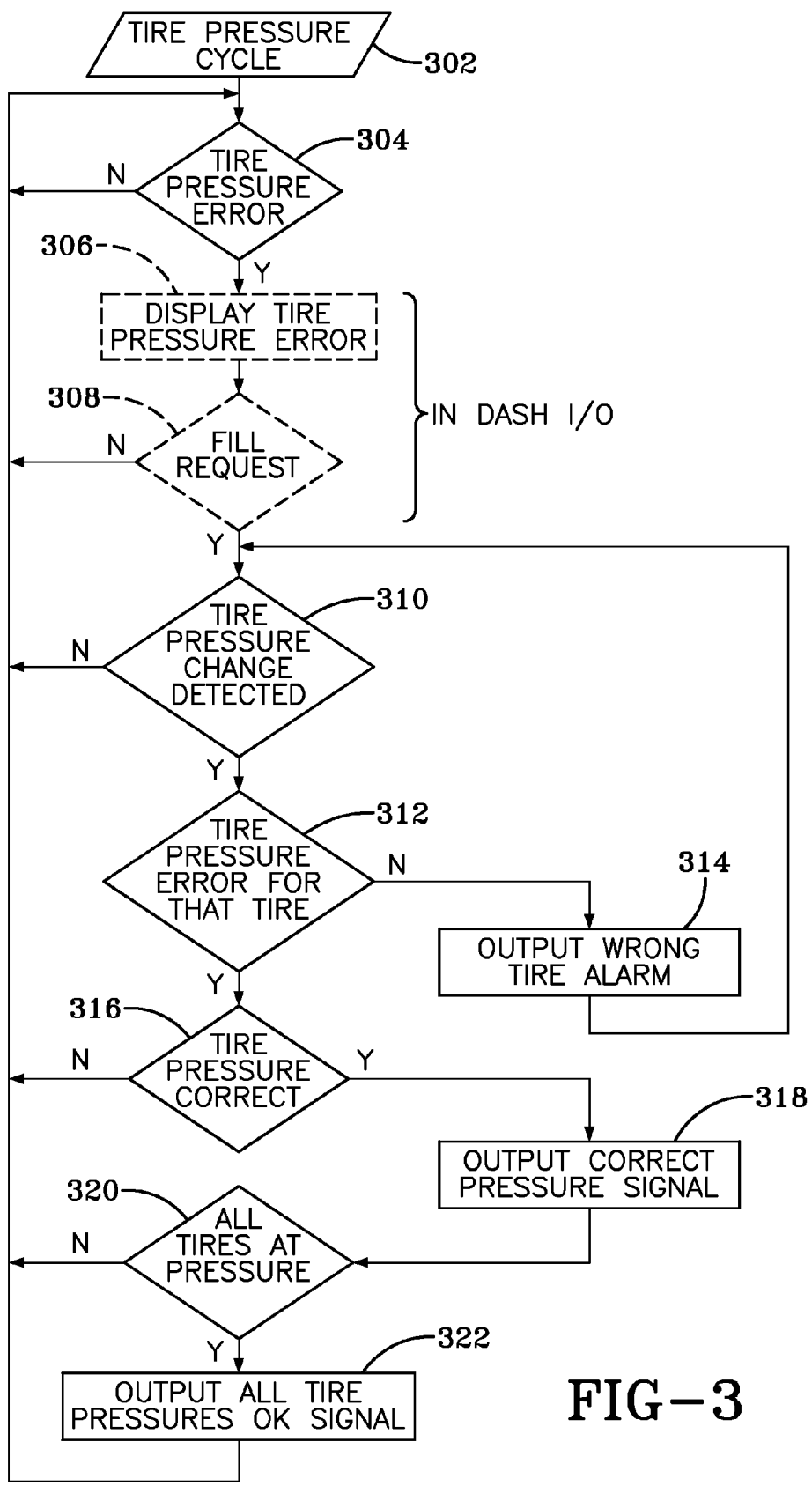
FIG. 3 is a schematic flowchart illustrating a process of using the tire condition monitoring system of FIG. 1.

A process for utilizing the tire pressure monitoring system 20 of FIG. 1 is illustrated in FIG. 3 as a tire pressure cycle program or sub-routine 302 that is executed using the ECU 28 or comparable computer. The ECU 28 first, at 304, determines, in a known manner, whether there is any tire pressure error detected by any of the tire condition monitors 33a-33d. The tire pressure error is then, at 306, displayed using the touch screen 32 in a display configuration comparable to that illustrated in FIG. 2. If any of the displays 44-50 indicate a cautionary pressure or an unacceptable pressure as indicated in displays 46 and 48, the ECU 28 then displays a fill push button 60 on the touch screen 32. In this exemplary embodiment, the fill push button 60 is activated by a user prior to changing the air pressure in any of the tires 24a-24d. The activation of the fill request push button is detected at 308 by the ECU 28. The fill push button 60 may only become visible when the ECU 28 detects that the vehicle 22 is stopped and in a parked position or, additionally, when a fueling activity is detected while the vehicle 22 is in the parked position. In the latter regard, the fill push button 60 may only become visible when the fuel filler door is detected by the ECU 28 to be open.

Thereafter, at 310, the ECU 28 then monitors the air pressure in each of the tires 24a-24d to detect whether air pressure in any of the tires changes. If a tire pressure change is detected, then, at 312, ECU 28 determines whether the tire in which the pressure is changing is one of the tires requiring an adjustment to its air pressure, for example, tires 24b or 24c as indicated by the respective displays 46 and 48. If the air pressure in any of the other tires is changing, for example, tires 24a or 24d, in which the pressure is acceptable as shown by displays 44 and 50, the ECU 28 then, at 314, generates a wrong tire alarm signal. Such a signal may be an audible alarm provided by the audio signal generator 40 and/or a visual alarm on the display 32, which is created, for example, by changing the color of the displays 44, 50 or causing the displays 44, 50 to blink.

If, at 312, the ECU 28 determines that the tire pressure being changed corresponds to a tire having a tire pressure error, for example, tires 24b or 24c, the ECU 28 then, at 316, continues to monitor the change in tire pressure until it reaches an acceptable level. At that point, the ECU 28 outputs, at 318, a correct pressure signal that is represented on the display 32 by the acceptable icon 52. In addition upon reaching an acceptable tire pressure level, the displays 46, 48 may switch to a green color, either as a solid color or blinking. In addition, an audible signal representing an acceptable tire pressure may be created by the audio signal generator 40. The ECU 28 then, at 320, determines whether all of the tires have an acceptable pressure. If a tire pressure error still exists, the process described with respect to steps 304-320 is repeated. Upon ECU 28 determining that all of the tires 24a-24d are at an acceptable pressure, then, at 322, the ECU 28 generates an appropriate visual display and/or audio signal.

While the present invention has been illustrated by a description of various embodiments and while these embodiments have been described in considerable detail, it is not the intention of Applicants to restrict or in any way limit the scope of the appended claims to such detail. Additional advantages and modifications will readily appear to those skilled in the art. Therefore, the invention in its broadest aspects is not limited to the specific details shown and described. Consequently, departures may be made from the details described herein without departing from the spirit and scope of the claims which follow.

What is claimed is:

1. A method of monitoring pressures in respective tires of a vehicle, the vehicle having tire pressure monitoring apparatus providing signals to a vehicle control representing pressures in respective ones of the tires, the vehicle control having user I/O, and the method comprising:
   detecting a tire pressure error in one of the tires;
   presenting to a user a first sensory perceptible signal representing the tire pressure error in the one of the tires;
   then, detecting a user input representing a prospective tire filling activity;
   then, detecting a change in a tire pressure in a first tire;
   determining if the first tire is substantially the same as the one of the tires;

presenting to the user a second sensory perceptible signal in response to the first tire being different from the one of the tires; and then, presenting a third sensory perceptible signal to the user in response to a pressure in the one of the tires being substantially equal to a desired tire pressure.

2. The method of claim 1 wherein the first sensory perceptible signal comprises a visual display.

3. The method of claim 1 wherein the user input comprises an input button on a visual display.

4. The method of claim 1 wherein the second sensory perceptible signal comprises at least one of a visual display or an audible signal.

5. The method of claim 1 wherein the third sensory perceptible signal comprises at least one of a visual display or an audible signal.

6. A method of monitoring pressures in respective tires of a vehicle, the vehicle having tire pressure monitoring apparatus providing signals to a vehicle control representing pressures in respective ones of the tires, the vehicle control having user I/O, and the method comprising:

activating the user I/O with the vehicle control to provide a tire pressure error signal identifying at least one of the tires having a pressure error;

then, monitoring the user I/O with the vehicle control to detect a user input representing a prospective tire filling activity;

determining with the vehicle control a change of tire pressure in a first tire;

determining with the vehicle control whether the first tire is the same as the at least one of the tires;

activating the user I/O with the vehicle control to provide a wrong tire signal in response to the first tire being different from the at least one of the tires; and then, activating the user I/O with the vehicle control to provide a tire filled signal in response to the pressure in the at least one tire being substantially equal to a desired tire pressure.

7. The method of claim 6 wherein the tire pressure error signal comprises a visual display.

8. The method of claim 6 wherein the user input comprises an input button on a visual display.

9. The method of claim 6 wherein the tire filled signal comprises at least one of a visual display or an audible signal.

10. The method of claim 6 wherein the wrong tire signal comprises at least one of a visual display or an audible signal.

11. A method of monitoring pressure in tires of a vehicle, the method comprising:

determining a presence of a tire pressure error in at least one of the tires;

generating a tire pressure error signal identifying the at least one of the tires in response to the determined tire pressure error;

then, detecting a user input representing a tire filling activity;

determining a change of tire pressure in a first tire;

determining whether the first tire is the same as the at least one of the tires;

generating a wrong tire signal in response to the first tire being different from the at least one of the tires; and then, generating a tire filled signal in response to the pressure in the first tire being substantially equal to a fill tire pressure.

12. The method of claim 11 wherein the tire pressure error is represented by a visual display.

13. The method of claim 11 wherein the user input comprises an input button on a visual display.

14. The method of claim 11 wherein the tire filled signal comprises at least one of a visual display or an audible signal.

15. The method of claim 11 wherein the wrong tire signal is one of a visual display and an audible signal.

\* \* \* \* \*